United States Patent
Kumar et al.

(10) Patent No.: US 12,164,906 B2
(45) Date of Patent: Dec. 10, 2024

(54) MODULAR MICROCODE (UCODE) PATCH METHOD TO SUPPORT RUNTIME PERSISTENT UPDATE

(71) Applicant: Intel Corporation, Santa Clara, CA (US)

(72) Inventors: Mohan J. Kumar, Aloha, OR (US); Sarathy Jayakumar, Portland, OR (US); Chuan Song, Shanghai (CN); Ruixia Li, Shanghai (CN); Siyuan Fu, Shanghai (CN); Jiaxin Wu, Shanghai (CN); Lui He, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1119 days.

(21) Appl. No.: 16/801,382

(22) Filed: Feb. 26, 2020

(65) Prior Publication Data

US 2020/0192659 A1   Jun. 18, 2020

(51) Int. Cl.
*G06F 8/656* (2018.01)
*G06F 8/654* (2018.01)
*G06F 21/57* (2013.01)

(52) U.S. Cl.
CPC .............. *G06F 8/656* (2018.02); *G06F 8/654* (2018.02); *G06F 21/572* (2013.01)

(58) Field of Classification Search
None
See application file for complete search history.

(56) References Cited

U.S. PATENT DOCUMENTS

| | | | |
|---|---|---|---|
| 10,684,843 B1* | 6/2020 | Subramanian | G06F 8/654 |
| 10,936,300 B1* | 3/2021 | Sun | G06F 16/2365 |
| 2010/0115202 A1* | 5/2010 | Zimmer | G06F 12/126 |
| | | | 711/E12.017 |
| 2014/0040605 A1* | 2/2014 | Futral | G06F 9/445 |
| | | | 713/2 |
| 2015/0178071 A1* | 6/2015 | Pavlik | G06F 12/128 |
| | | | 717/168 |
| 2017/0010875 A1* | 1/2017 | Martinez | G06F 21/60 |
| 2020/0082090 A1* | 3/2020 | Samuel | G06F 8/654 |

OTHER PUBLICATIONS

Kranz, Garry, "United Extensible Firmware Interface (UEFI)", TechTarget, last retrieved from https://www.techtarget.com/whatis/definition/Unified-Extensible-Firmware-Interface-UEFI on Sep. 30, 2023 (Year: 2021).*

* cited by examiner

*Primary Examiner* — Andrew M. Lyons
(74) *Attorney, Agent, or Firm* — Compass IP Law PC

(57) ABSTRACT

A modular microcode (uCode) patch method to support runtime persistent update and associated apparatus. The method enables BIOS uCode patches to be received during platform runtime operations and written to first and second uCode extension regions as uCode images for a firmware device layout that further includes a uCode base region in which a current uCode image is stored. Following a platform reset, the first and second uCode extension regions are inspected to determine if one or more valid and newer uCode images (than the current uCode image) are present. If so, the newest uCode image is booted rather than the current uCode image. Following a successful boot, the newest uCode image is copied to the uCode base region to sync-up the current uCode image to the newest version. In one aspect, received uCode images are written to the first and second uCode extension regions in an alternating manner to support roll-back.

20 Claims, 13 Drawing Sheets

MODULAR MICROCODE (UCODE) PATCH METHOD TO SUPPORT RUNTIME PERSISTENT UPDATE

BACKGROUND INFORMATION

The use of cloud-hosted services and applications has exploded in the past decade and continues to grow at an exponential rate. Cloud-hosted services and applications are generally implemented in large data centers housing thousands of compute platforms such as servers, blade servers, server modules, micro-servers, etc. Oftentimes, the platforms are configured as virtualized execution used for hosting virtual machines and "containers" or the like in which software applications are run.

Each platform includes physical hardware, firmware (also referred to as BIOS—Basic Input-Output System), and software. The root of trust for the platform is the platform hardware and firmware, which although less susceptible to malicious actors that software still may pose a risk. For security and other reasons (e.g., performance), platform firmware may need to be updated.

Historically, the BIOS in personal computer (PC) platforms was a monolithic block of code that was installed in Read-Only Memory (ROM), wherein BIOS was updated by replacing the BIOS ROM chip. Subsequently, the BIOS was installed in EEPROM (Electrically Erasable Programmable Read-Only Memory) and could be replaced (in its entirely) via a firmware update. In approximately 1998, Intel® Corporation began development of a modular firmware architecture known as the Extensible Firmware Interface (EFI). In 2005, the Unified EFI forum was formed as an industry-wide organization to promote adoption and continue the development of the EFI Specification. Using the EFI 1.10 Specification as the starting point, this industry group released began releasing firmware specifications, renamed Unified EFI (UEFI). UEFI firmware dominates today's platform architectures. UEFI firmware has a modular architecture that includes a core block to which modules are added, wherein the core block is booted first and the booted code is used to load the modules during platform boot. Also, rather than EEPROMs, most of today's firmware is stored in flash memory (sometimes referred to as BIOS flash and referred to as persistent flash memory). More generally, platform firmware may be stored in a non-volatile storage device, which includes but is not limited to flash memory and EEPROMs.

Under some platform architectures, bootloaders may be used to load platform firmware. For example, bootloaders are used for mobile devices and some server platforms.

FIG. 1 shows a diagram 100 depicting cloud customers' process to upgrade uCode patch, including a runtime method and persistent patch update into BIOS flash. The process start with a CPU (central processing unit, also referred to as a processor) vendor issuing a uCode release 102, which may be provided to an end user (or otherwise made available to an end user) and/or may be provided or made available to an OEM/ODM (original equipment manufacturer/original design manufacturer, such as a platform vendor) According to an uCode update plan 104, if uCode release 102 is a uCode runtime patch, it can be immediately applied using an operating system (OS) kernel tool without system reset, as depicted in a push uCode patch for runtime update block 106. However, if uCode release 102 needs a BIOS release (e.g., a persistent patch process that needs to update the uCode in boot time through a BIOS update package that requires a system reset to apply the update into persistent flash memory), uCode update plan 104 entails requesting the OEM/ODM for a new BIOS package. The OEM/ODM will prepare a new Bios package with new uCode 108 and provide it to the end user. As depicted in a block 110, the end user will push the new BIOS package to a BIOS upgrade queue. At some subsequent point in time, which could take days, weeks, months, or longer), a scheduled system reset is used to complete installation of the uCode BIOS patch.

For cloud scenarios (e.g., cloud-hosted services and applications), the persistent patch process is problematic and poses risks from operation perspective:
The cloud customer (i.e., end user) needs to ask platform vendors to build the new BIOS package with the required uCode;
The cloud customer has to put the new BIOS package into a BIOS upgrade queue and wait for the time to schedule the system reset to update the patch into BIOS flash;
The cloud scenario is very resistant to the system reset request because the system reset needs service migration and impact service uptime, and the result is a lot of BIOS release packages are pending in the upgrade queue without update in a timely manner;
This results in a long and risky process for cloud operation. Failure to apply the right uCode patch during a next system reboot causes problems on security, performance and reliability.
Downtime required for implementing such BIOS persistent patch processes may result in cloud providers not meeting service level agreement (SLA) metrics, further providing financial incentives to delay scheduling of BIOS updates. At the same time, malicious actors continue to develop ever-more advanced attacks, including development of attack vectors that may reach the platform BIOS level.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIGS. 3a-3e illustrate states of the BIOS flash layout corresponding to different timeframes in connection handling multiple uCode patches, wherein FIG. 3a illustrates the state of the BIOS flash layout at a first timeframe, FIG. 3b illustrates the state of the BIOS flash layout at a second timeframe, FIG. 3c illustrates the state of the BIOS flash layout at a third timeframe, FIG. 3d illustrates the state of the BIOS flash layout at a fourth timeframe, and FIG. 3e illustrates the state of the BIOS flash layout at a fifth timeframe;

DETAILED DESCRIPTION

Figure 1:
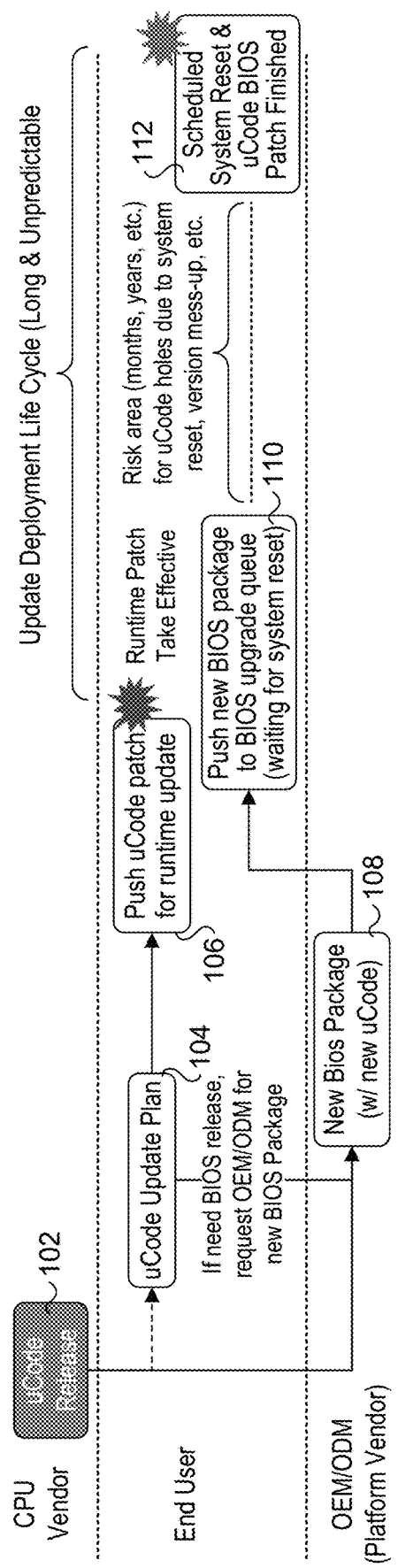
FIG. 1 is a schematic diagram illustrating a conventional BIOS update process.

Embodiments of a modular microcode (uCode) patch method to support runtime persistent update and associated apparatus are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, a novel runtime update method to apply uCode patch into BIOS flash persistently while applying a runtime OS uCode patch into a platform or system is provided. This approach eliminates requirements on additional BIOS package release and system reset for persistent uCode update into BIOS flash, which help relieve the burden on cloud customers when applying uCode updates.

Figure 2:
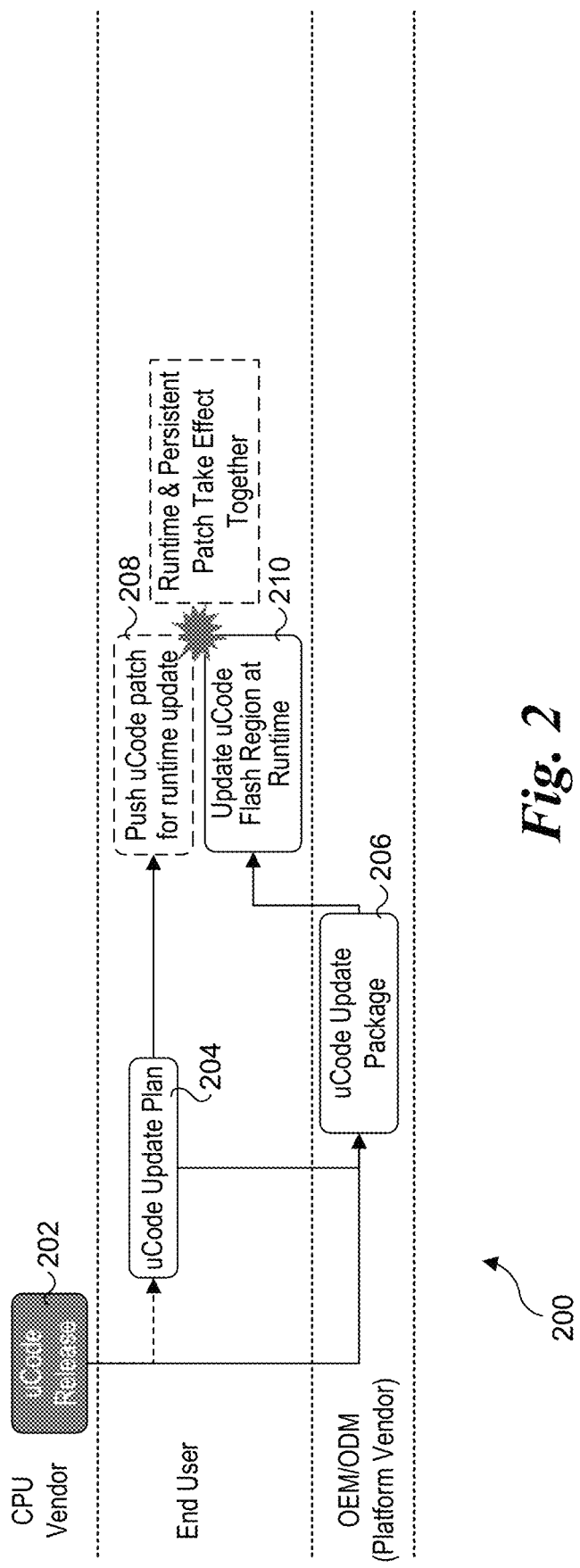
FIG. 2 is a schematic diagram illustrating a high-level view of a modular uCode patch method to support runtime persistent update, according to one embodiment.

A diagram 200 illustrating a high-level view of an embodiment of the approach is shown in FIG. 2. As before, the process begins with the CPU vendor issuing a uCode release 202 that is provided to end users (e.g., cloud customers) and/or platform vendors or is otherwise made available to the end users and platform vendors (e.g., via download). If the uCode patch employ late-binding firmware that is able to be implemented by an operating system during runtime using kernel tool or the like, the end user employs a uCode update plan 204 that will push the uCode patch for runtime update, as depicted by a block 208. In parallel, the platform vendor uses uCode release 202 to create a uCode update package 206, which is provided to the end user. uCode update package 206 will then be used to update a uCode flash region at runtime, as depicted by a block 210. As a result, the runtime update of the OS uCode patch and persistent uCode patch take effect together.

In other instances, the uCode patch (or patches, as explained below) include uCode that cannot be implemented during runtime. In this case, the OEM/ODM creates the uCode update package and provides it to the end user. In the case of a cloud operator, uCode release 202 may be provided to the cloud operator, and the cloud operator will prepare the uCode update package (not shown).

Figure 3:
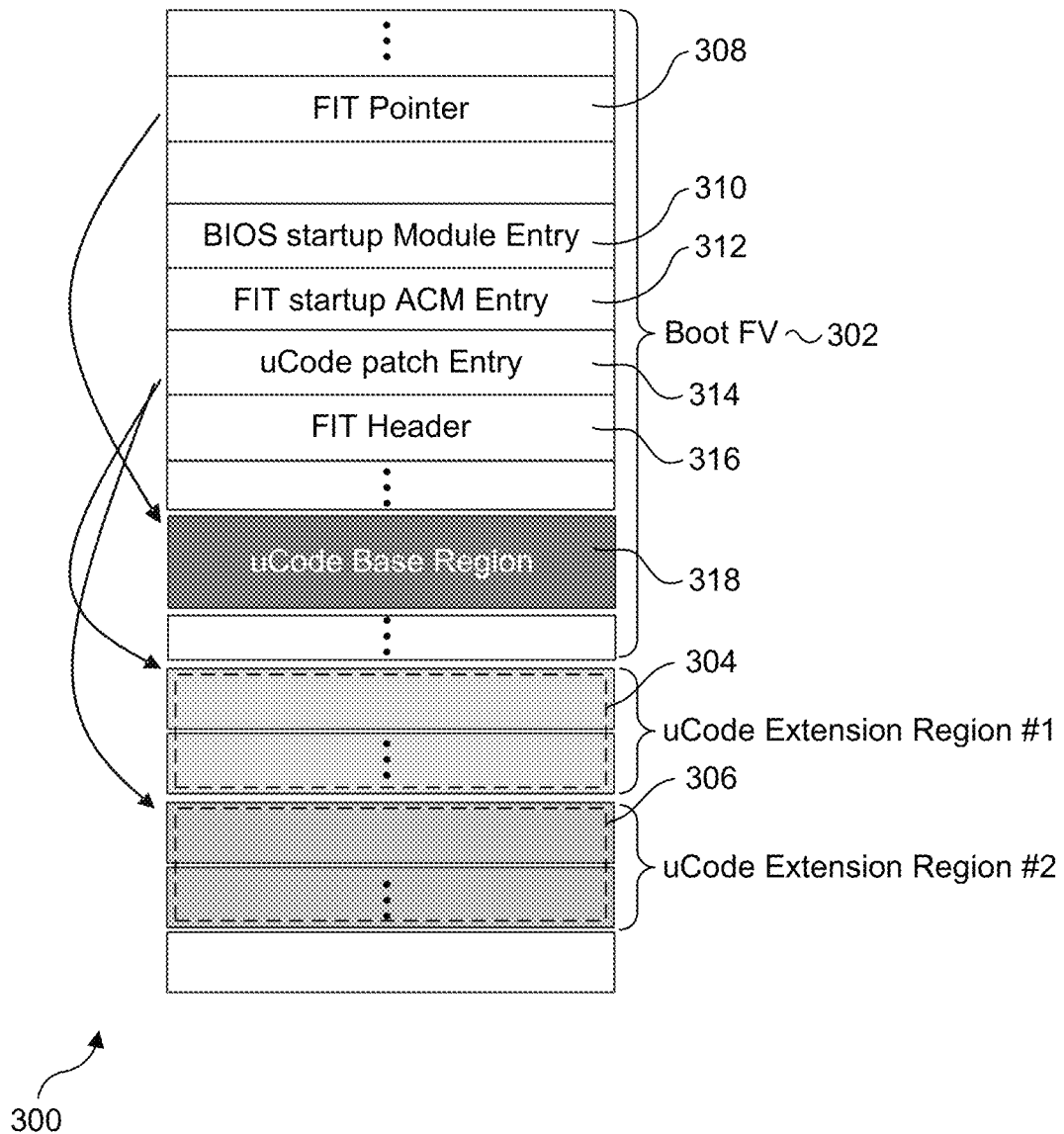
FIG. 3 is a diagram illustrating the structure of a BIOS flash layout, according to one embodiment.

FIG. 3 shows a diagram 300 illustrating the structure of a BIOS flash layout, according to one embodiment. In one implementation, the BIOS region mapped to an address of 4G minus 16 MB is divided into three FVs (firmware volumes), as depicted by a Boot FV 302, a uCode Extension FV 304 that may be stored in one or more slots in a uCode extension region #1) and a uCode Extension FV 306 that may be stored in one or more slots in a uCode extension region #2. Boot FV 302 contains a reset vector to (the starting address for) Firmware Interface Table (FIT) pointers 308, a BIOS startup module entry 310, a FIT startup ACM entry 314, a uCode path Entry 314, a FIT header 316, and a uCode base image 318 (that corresponds to the latest bootable uCode image). In BIOS FV 302, FIT pointer 308 is fixed and is not permitted to be changed via a runtime update. uCode extension region #1 and uCode extension region #2 are uCode extension regions used to store the runtime uCode patches (also referred to as FVs or uCode images).

FIT pointer 308 comprises an entry table with pointers (entry points) to various regions in the BIOS flash layout. In one embodiment, the location and size of uCode regions in BIOS flash are fixed, and thus the entry table for FIT pointer 308 will not be updated while updating contents of uCode regions.

In one embodiment, if uCode extension regions #1 and #2 are empty, the starting address for uCode extension region #1 is located at 0xFFFF_FFFF. In one embodiment, all uCode extension regions (e.g., uCode extension regions #1 and #2 in the embodiments illustrated herein) support modular update by the host operation system at runtime and the boot firmware service at boot time. During a subsequent boot, if the uCode update entries are valid, they will be utilized to load the uCode with a higher version number, as described and illustrated below.

Figure 4:
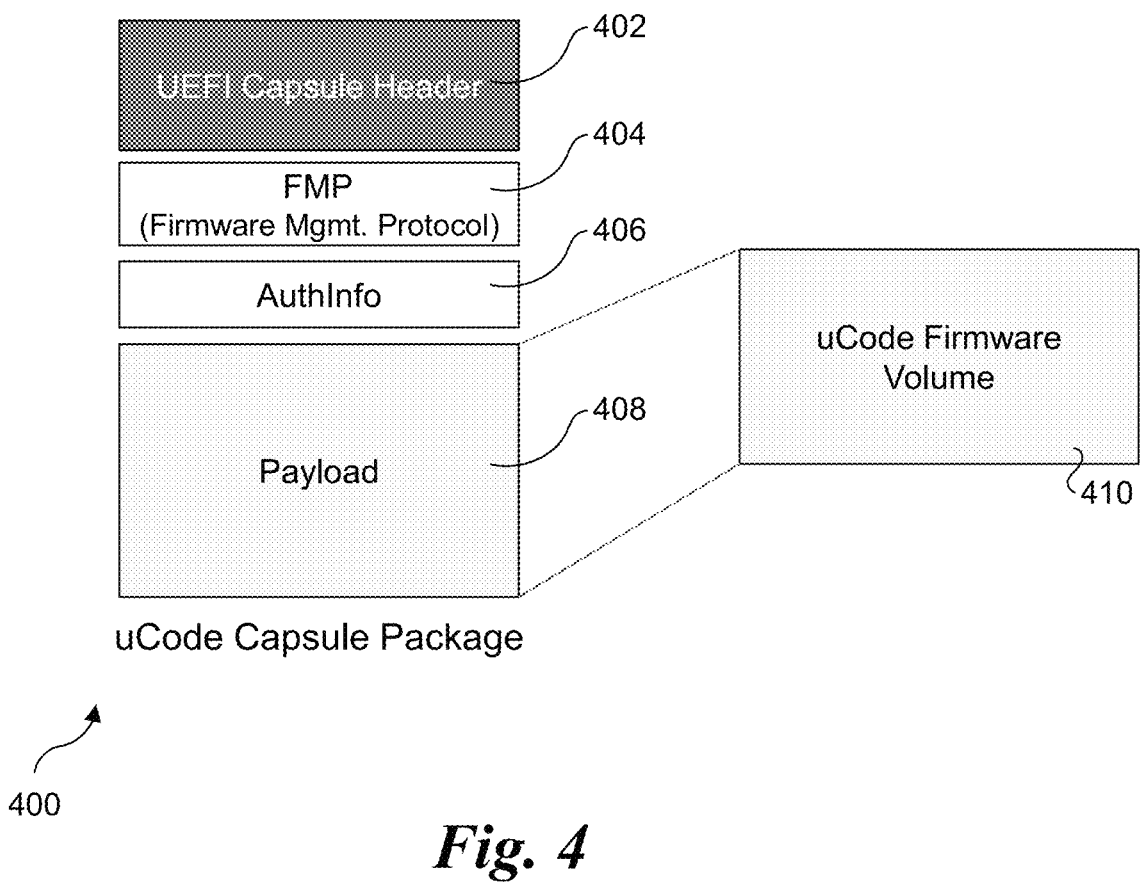
FIG. 4 is a diagram of a uCode capsule package, according to one embodiment.
Figure 5:
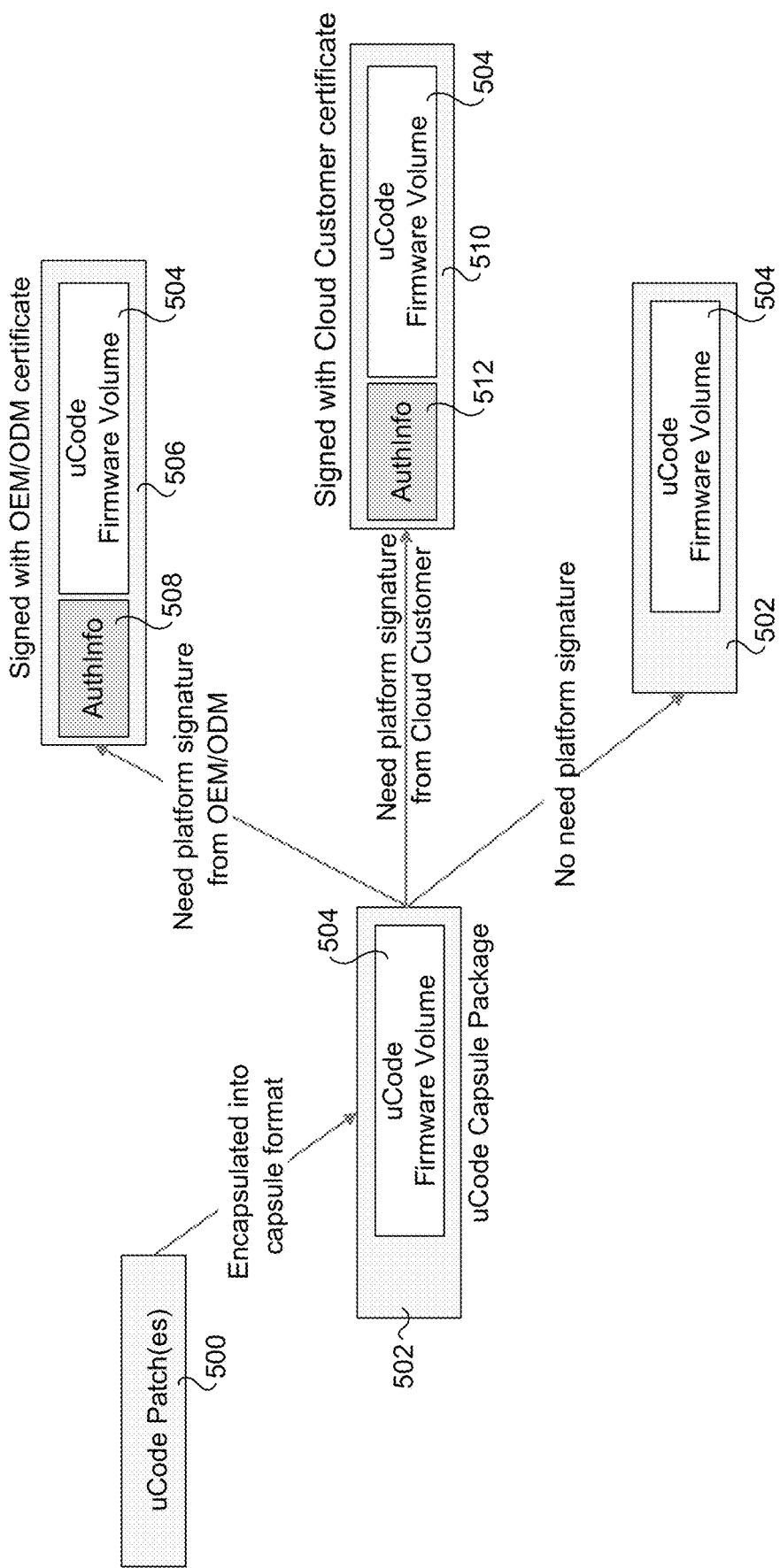
FIG. 5 is a diagram illustrating an embodiment of an encapsulation process that produces different uCode capsule package formats including formats with and without authentication information comprising signed certifications.

In some embodiments, the uCode patch is encapsulated into a capsule format and a capsule firmware update interface is used to update the uCode regions in BIOS flash. The capsule format uCode image can be built by either an offline phase or online phase to support flexible integrity check method. Examples of capsule formats and packaging schemes are shown in FIGS. 4 and 5. In one embodiment, the capsule formats comply with the capsule format defined by an appliable UEFI specification.

As illustrated in FIG. 4, a uCode capsule package 400 includes a UEFI capsule header 402, a firmware management protocol (FPM) field 404, an authentication information (AuthInfo) field 406, and a payload 408 containing a uCode firmware volume 410. In one embodiment, the uCode patch is encapsulated into standard capsule format (e.g., uCode capsule package 400) by some system utility to ensure the uCode capsule package for the same CPU SKU (stocking unit—i.e., the same CPU part) is compliant across different platform vendors' BIOS implementations.

An SMI (System Management Interrupt) hander is defined in BIOS to parse the uCode patch from the capsule image. Generally, the uCode capsule package 400 can be dynamically generated either by offline tools from the OEM/ODM/platform vendor or by online tools from the cloud customer configured to support flexible release and variable security check requirements. To support the integrity check for the update image, a signature may be added into AuthInfo field 406; this signature is created using platform credentials from either the OEM/ODM/platform vendor or from cloud customers. For such cases (employing signatures), in one embodiment the SMI handler is configured to check the integrity of the BIOS update image by validating this signature with an internal platform credential.

In some instances, a given uCode release will including multiple uCode patches that are configured to be implemented on the same CPU model while supporting different stepping levels. For example, stepping levels for a CPU may including A0, A1, A2, etc. In the cases where changes are more significant, the stepping levels may use a next letter, such as B0, then B1, B2, etc. The uCode patches for a CPU model for a given stepping level may differ from uCode patches for that CPU model for another stepping level, thus multiple uCode patches may be included in an update package.

Generally, an OEM/ODM may create an uCode update package with multiple uCode patches to support multiple stepping levels for a CPU model or produce (e.g., blade server, server module, etc. for which the uCode update package is targeted. For example, a platform vendor may manufacture and sell a given blade server for several years employing the same CPU model, while during that time the stepping versions of the CPU model will have changed. Thus, a uCode update for the blade server may require multiple patches.

In the case of a cloud operator, uCode update packages may be more targeted to only be implemented on a CPU model with a specific stepping level. In this case, the uCode update package may only include a single uCode patch. In other cases, the cloud operator may generate uCode update packages with multiple uCode patches.

As shown in FIG. 5, the encapsulation process starts with one or more uCode patches 500 that are encapsulated into a uCode capsule format 502 including a uCode firmware volume 504. If a platform signature from an OEM or ODM is needed, a uCode capsule format 506 signed with an OEM/ODM certificate is generated, including an AuthInfo field 508 (containing the certificate) and uCode firmware volume 504. If a signature from a cloud customer is needed, a uCode capsule format 510 signed with a cloud customer certificate is generated, including an AuthInfo field 512 (containing the certificate) and uCode firmware volume 504. If no platform signature is needed, uCode capsule package 502 can be provided as is.

In one embodiment, a "ping-pong" scheme is used to alternatively update uCode extension FVs to support rollback to the most recent uCode patch in case some failures/exceptions crash the uCode extension FV being updated. The ping-pong scheme is used to alternatively update two uCode extension FVs, e.g., uCode Extension FV #1 and uCode Extension FV #2 in FIG. 3 and uCode images in uCode extension regions #1 and #2 in FIGS. 3a-3e presented below. If the uCode extension FV being updated is crashed due to some exceptions, such as an unexpected system shutdown or hang, the system is able to roll back to the most recent uCode patch from the alternative uCode extension FV. Under one embodiment, uCode base region 318 in Boot FV 302 is defined as one backup region to store the uCode base image; this region supports sync-up to latest bootable uCode image in a subsequent (next) boot.

Figure 6:
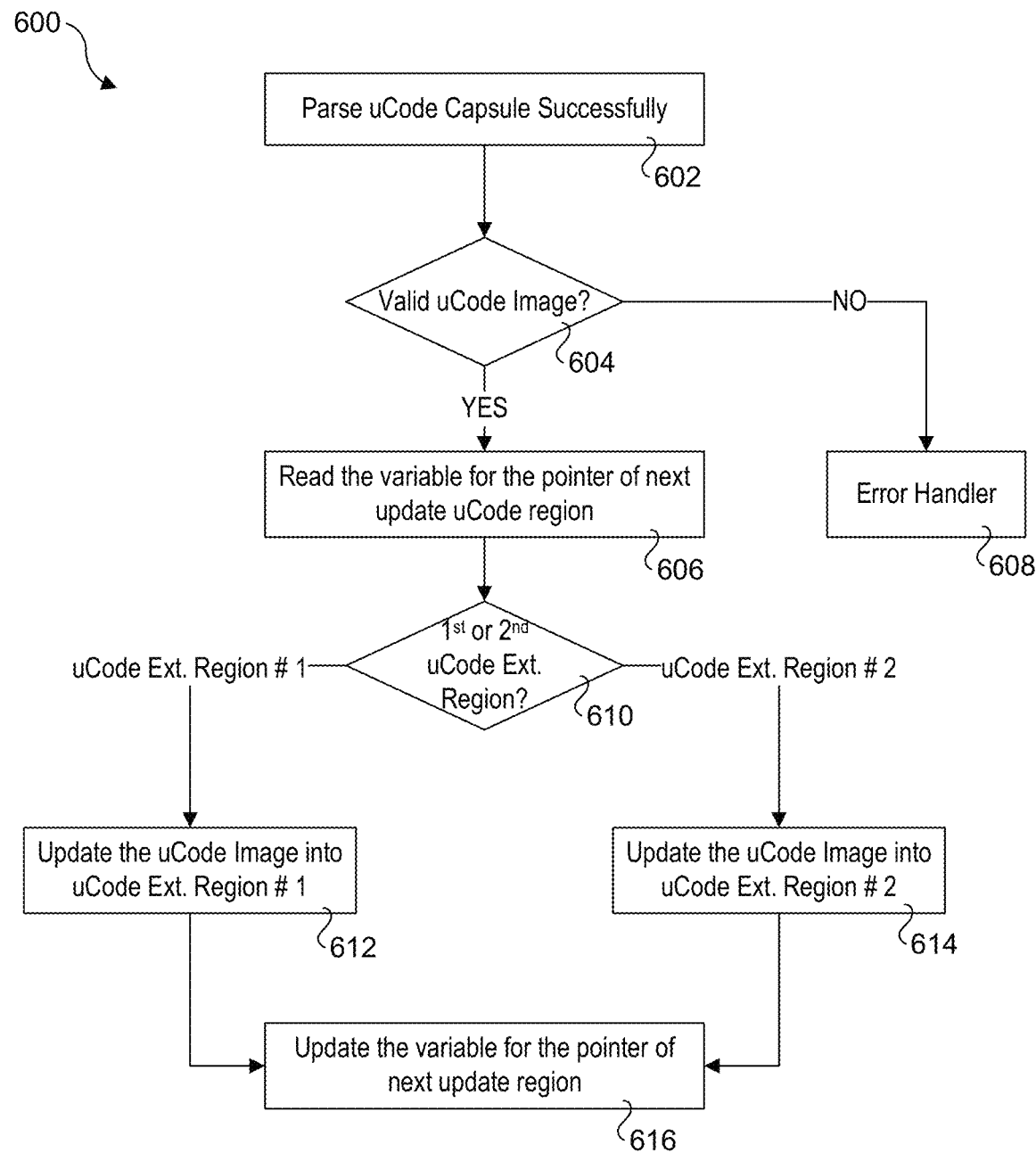
FIG. 6 is a flowchart illustrating logic and operations for implementing a ping-pong scheme under which uCode images are written to first and second uCode extension regions in an alternating manner, according to one embodiment.

FIG. 6 shows a flowchart 600 illustrating logic and operations for implementing the ping-pong scheme, according to one embodiment. The process begins in a block 602 in which the uCode capsule has been successfully parsed. In a decision block 604 a determination is made to whether the uCode image is valid. If the uCode image is determined to be invalid, the answer to decision block 604 is NO, and the logic proceeds to an error handler 608. If the uCode image is determined to be valid, the answer to decision block 604 is YES, resulting in the logic proceeding to a block 606 in which the variable for the pointer (e.g., the base address of uCode extension region #1 or #2) of the next update uCode region is read. In one embodiment this pointer value is stored in uCode patch entry 314.

In a decision block 610 a determination is made to whether uCode extension region #1 or uCode extension region #2 is to be used to store the uCode patch image. In one embodiment this determination is made based on the pointer value in uCode patch entry 314. If the pointer value in uCode patch entry 314 points to uCode extension region #1, the logic flows to the left-hand branch where the uCode image is written to uCode extension region #1, as depicted in a block 612. If the pointer value in uCode patch entry 314 points to uCode extension region #2, the logic flows to the right-hand branch where the uCode image is written to uCode extension region #2, as depicted in a block 614. For both branches, the logic then proceeds to a block 616 in which the variable for the pointer of the next update region is updated to reflect which uCode extension region will be used next (e.g., swapped to point to the uCode extension region that wasn't used).

Figure 3A:
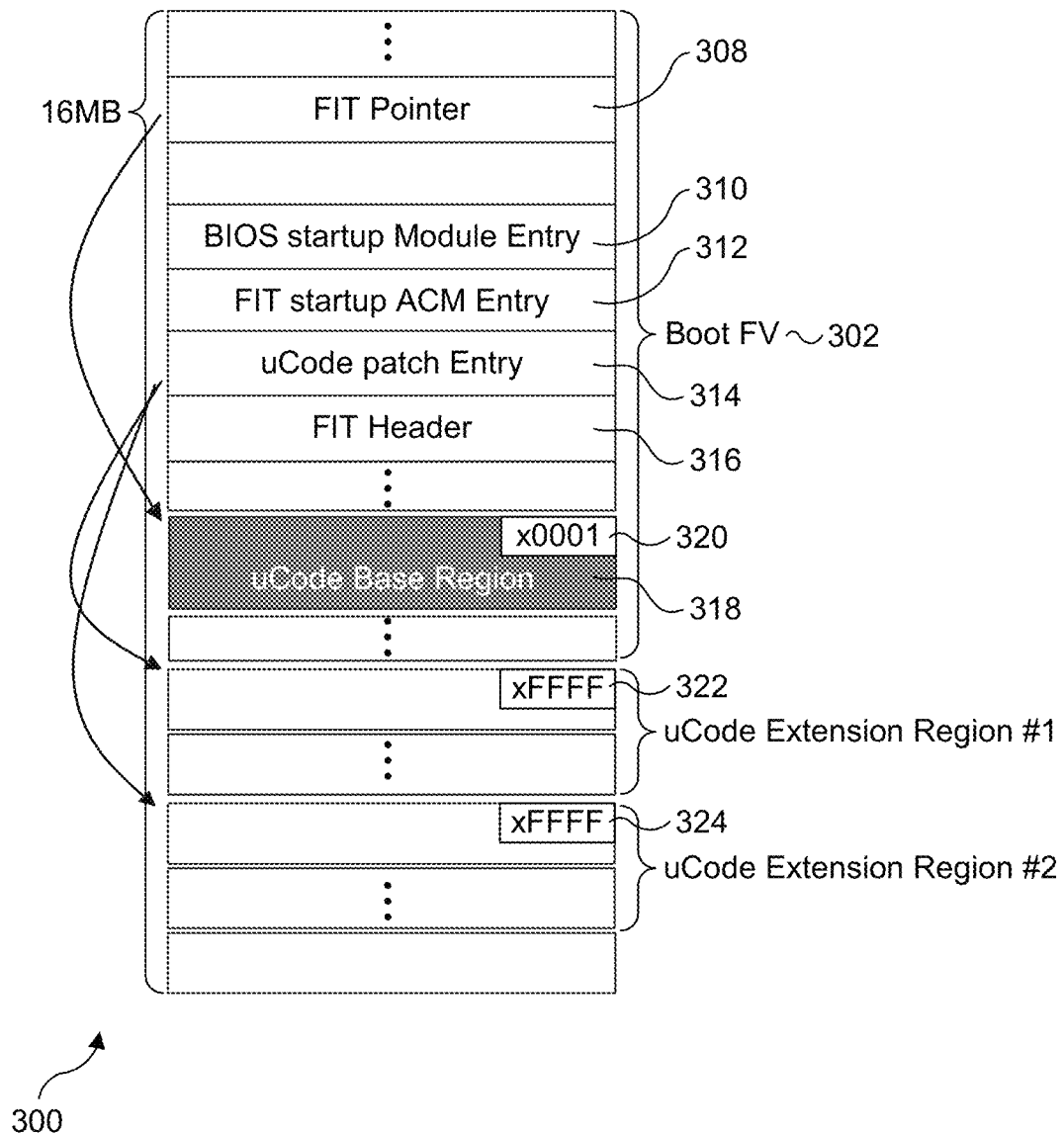

An initial configuration of the BIOS flash layout prior to receiving any uCode patches and corresponding to a first timeframe T1 is shown in FIG. 3a. In one embodiment, each firmware image will include a version number, such as depicted by a version number 320 for uCode base region 318. In this initial configuration, each of uCode extension region #1 and uCode extension region #2 are empty, except for headers 322 and 324 with values of xFFFF, which in one embodiment is used to indicate the firmware volume in the uCode extension region is invalid or corrupt. In one embodiment, uCode patch entry 314 will initially include pointers to both uCode extension region #1 and uCode extension region #2, and during boot both uCode extension region #1 and uCode extension region #2 will be inspected to see if they are storing a valid firmware volume.

Figure 3B:
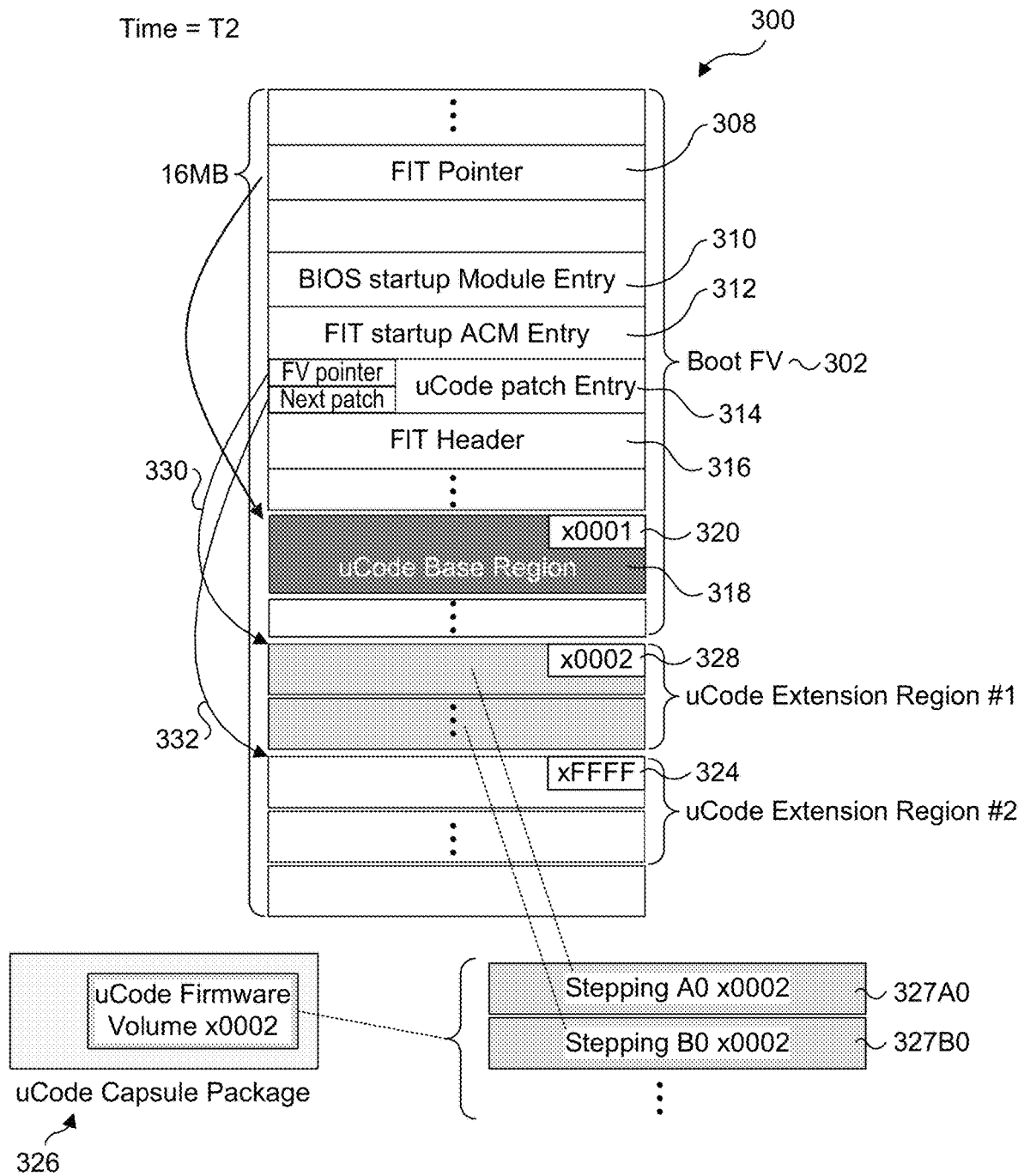

FIG. 3b illustrates a second timeframe T2 during which a uCode capsule package 326 comprising a first uCode update package has been received including a first set of uCode patches depicted as uCode patches 327A0 and 327B0. The uCode patches are written to uCode extension region #1 as a uCode image (also referred to as a firmware volume). As further shown, this uCode image has a version number of x0002 (included in a header 328), indicating it is a newer version than the current firmware volume (uCode image) stored in uCode base region 320. uCode patch entry 314 now is depicted as including a firmware volume pointer 330 that points to the starting address for uCode extension region #1 (and thus points to uCode FV version x0002), and a next patch pointer 332 that points to the starting address for uCode extension region #2, which will be used to store the next uCode patch.

Figure 3C:
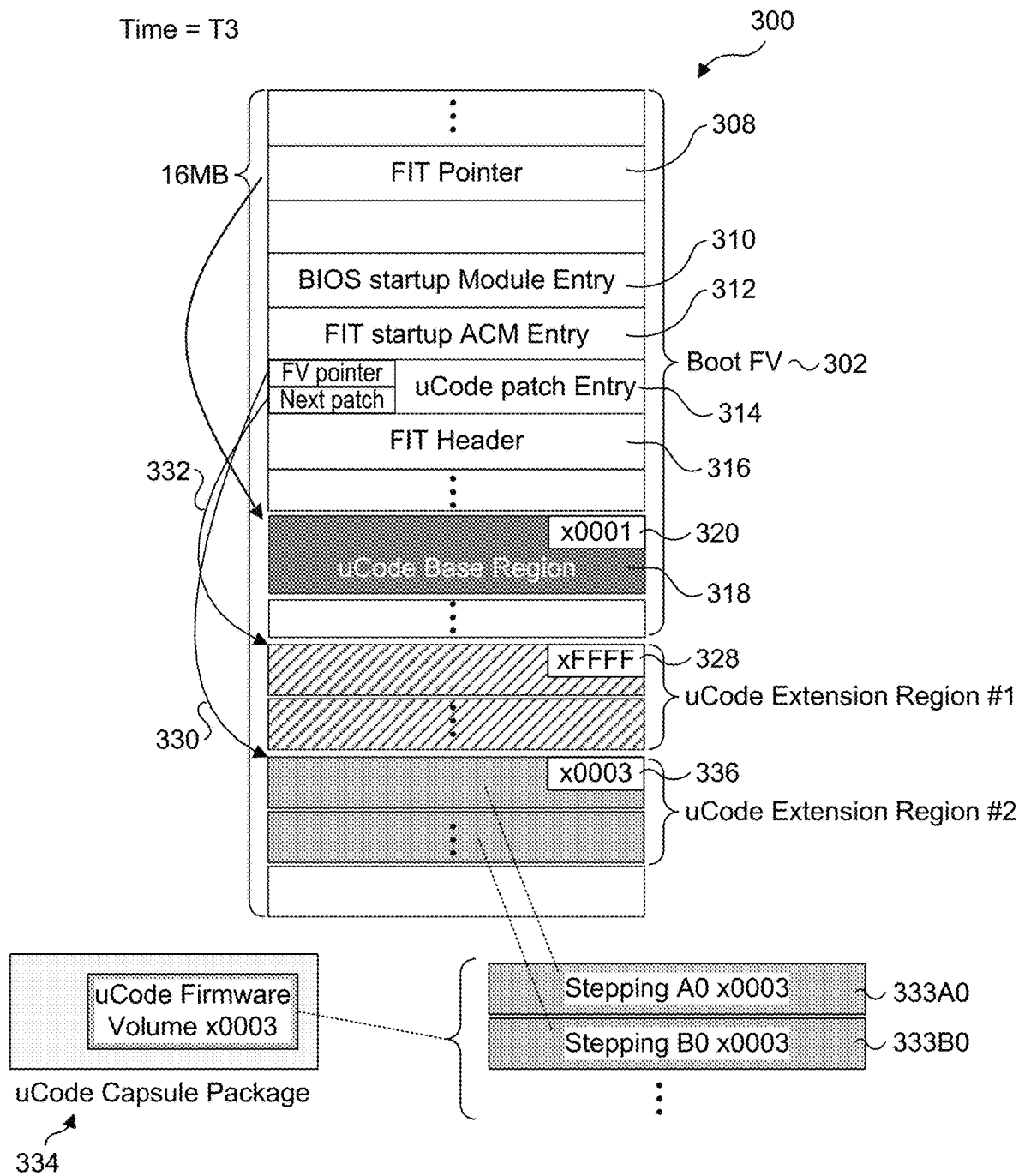

FIG. 3c illustrates a third timeframe T3 during which a second set of uCode patches (depicted as uCode patches 333A0 and 333B0) encapsulated in a uCode capsule package 334 has been received and has been successfully written to uCode extension region #2 as uCode firmware volume version x0003 (as indicated in a header 336). Version number x0003 is a newer FV version than both the current FV stored in uCode base region 320 and uCode FV version x0002. FV pointer 330 of uCode patch entry 314 now points to the starting address for uCode extension region #2 (and thus points to uCode FV version x0003), while next patch pointer 332 points to the starting address for uCode extension region #1, which will be used to store the next uCode image extracted from the next uCode update package.

Figure 7:
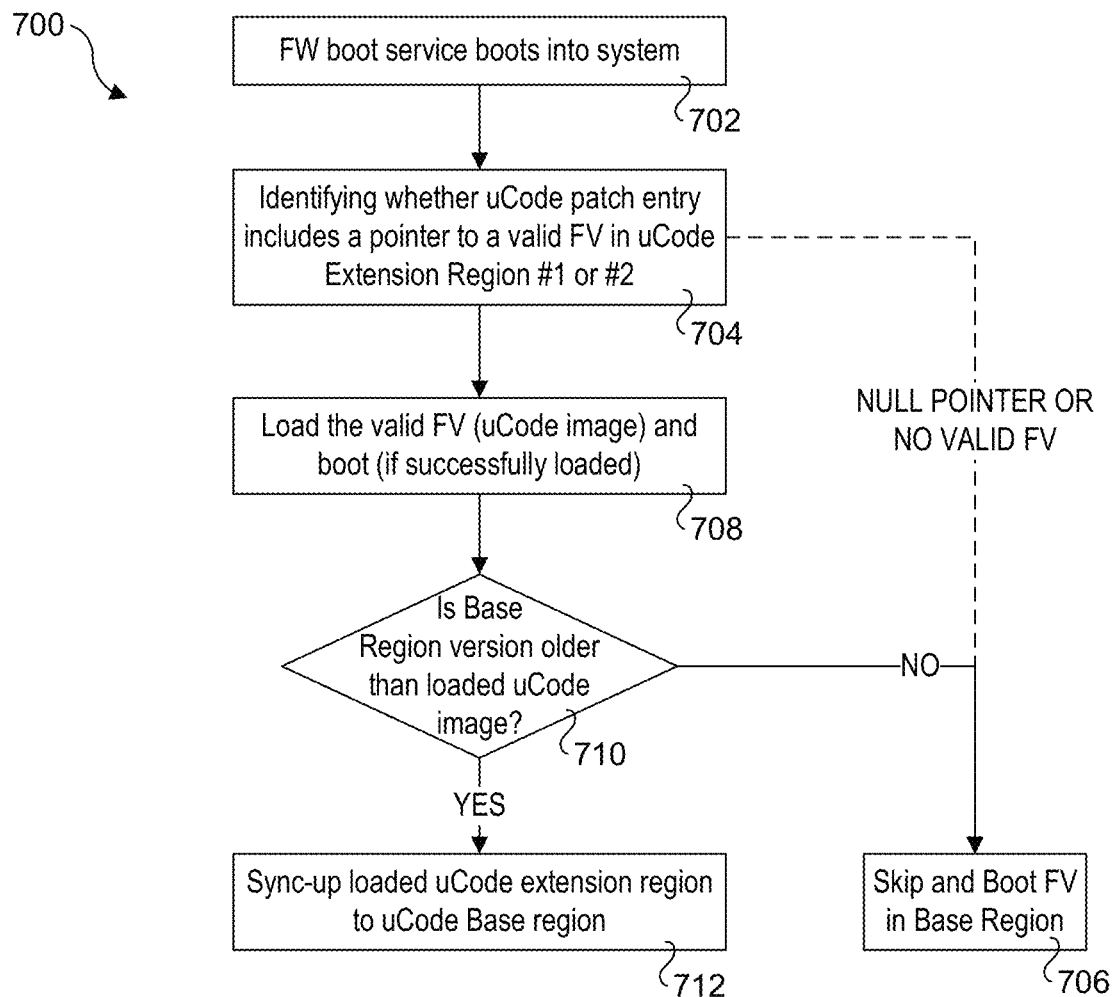
FIG. 7 is a flowchart illustrating logic and operations implemented by a firmware boot service to selective boot a most recent uCode image, according to one embodiment.

In accordance with another aspect of the uCode patch update scheme, during a next BIOS boot process, the latest firmware image (e.g., FV with the highest version number) is copied into the uCode base region as part of a base region sync-up processes. Operations and logic for implementing this process, according to one embodiment, are shown in a flowchart 700 of FIG. 7.

The process begins in a block 702 in which the firmware boot service boots into the system. In a block 704 the firmware boot service identifies whether uCode patch entry 314 includes a pointer to a valid FV in uCode extension region #1 and #2. In one embodiment, uCode patch entry 314 employs permanent pointers to slots in each of uCode extension region #1 and #2, and thus both uCode extension regions are checked for a valid FV. In another embodiment, such as illustrated in FIGS. 3b and 3c, uCode patch entry 314 includes FV pointer 330 that points to a valid FV (which will be stored in either uCode extension region #1 or #2). If neither uCode extension region #1 nor #2 stores a valid FV, the logic proceeds to a block 710 in which the FV in uCode base region 318 is booted.

If a valid FV is found in block 704, that uCode image corresponding to the FV will be loaded and booted (if successfully loaded) in a block 708. In a decision block 710 a determination is made to whether the uCode image in uCode base region 318 is older than the loaded uCode image. If not, the answer is NO and the logic proceeds to block 706 in which the loaded uCode image is skipped and the uCode image in uCode base region 318 is loaded and booted. If the loaded uCode image is newer than the uCode base region 318 image, the answer to decision block 710 is YES, and the logic proceeds to a block 712 in which the loaded image from uCode extension region #1 or #2 (as applicable) is synced-up to uCode base region 318 by copying the uCode image into uCode base region 318. This results in updating the uCode image in uCode base region 318 to the most recent version.

It is noted that during a sync-up process either a portion of the uCode in uCode base region 318 is updated/replaced, or all the uCode is updated/replaced, depending on the configuration and contents of the update package. For example, under a modular firmware architecture, such as UEFI, the firmware (BIOS uCode) comprises a combination of core UEFI components and extensions implemented as UEFI modules that are also referred to as images, such as UEFI driver images and UEFI application images. In some instances, a uCode patch may be targeted to a particular UEFI module, and thus only uCode for that particular UEFI module is updated/replaced during the sync-up process rather than updating/replacing the entirety of the uCode in the uCode base region.

Figure 3D:
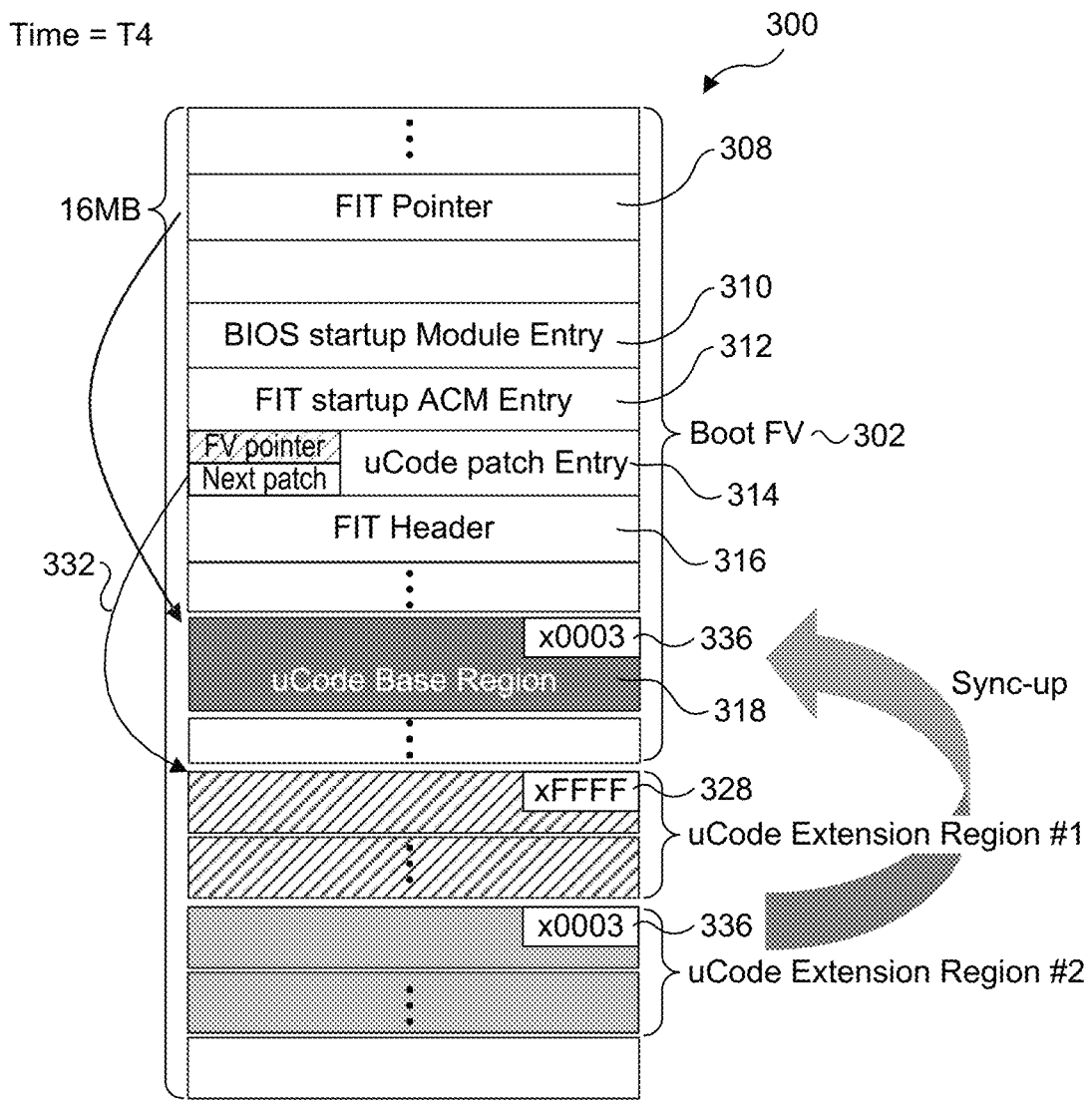

An example of this sync-up process is illustrated in FIG. 3d, which corresponds to a timeframe T4. In this instance, a uCode image with version x0003 is loaded from uCode extension region #2, and after confirmation that it has successfully booted, the uCode image is written to uCode base region 318. This results in the most recent uCode image being stored in uCode base region 318. As a result, in the illustrated embodiment FV pointer 332 is set to 0XFFFF (or some other predefined value) to indicate that there are no newer uCode images in either uCode extension region #1 or #2. As further shown, next patch pointer 332 still points to uCode extension region #1.

In some embodiments under which multiple stepping version uCode patches are included in an update package, the SMI BIOS code may be configured to filter for only those uCode patches that have a stepping version that matches the stepping version of the processor. Under this approach, providers of uCode update packages can build and send out update package with multiple stepping versions without having to know the particular stepping version that is implemented by each processor for which uCode is to be updated.

Figure 3E:
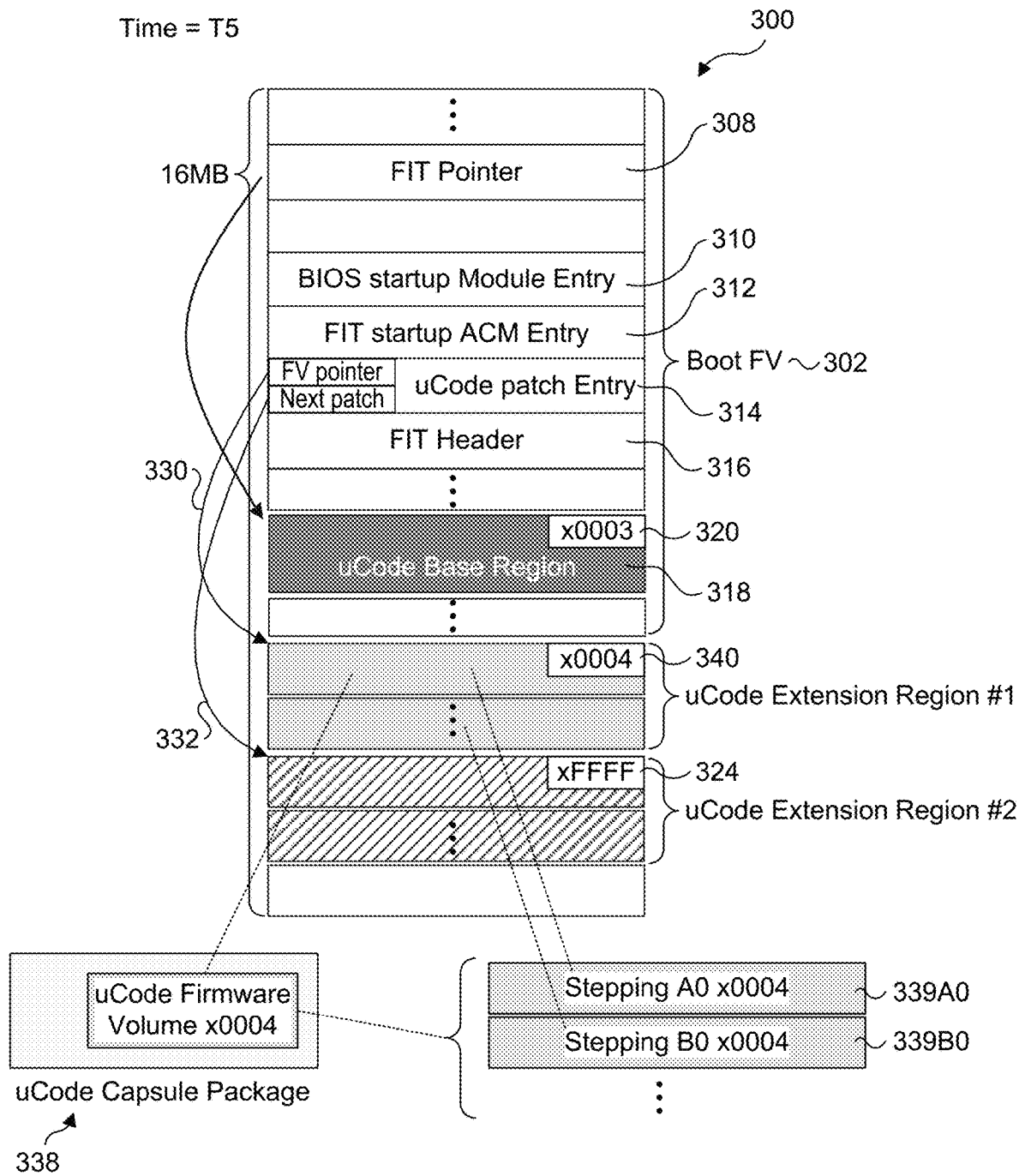

The state of the BIOS flash layout after a fifth timeframe T5 is shown in FIG. 3e. During this timeframe, a third uCode capsule package 338 is received that includes a uCode FV having a version x0004 and including uCode patches 339A0 and 339B0. This uCode image is written to uCode extension region #1, which corresponded with the uCode extension region pointed to by next patch pointer 332 following timeframe T4 in FIG. 3d. Following the ping-pong scheme, the value for next patch pointer 332 is swapped to now point to uCode extension region #2, which will be the uCode extension region to be used for the next uCode patch.

Figure 8:
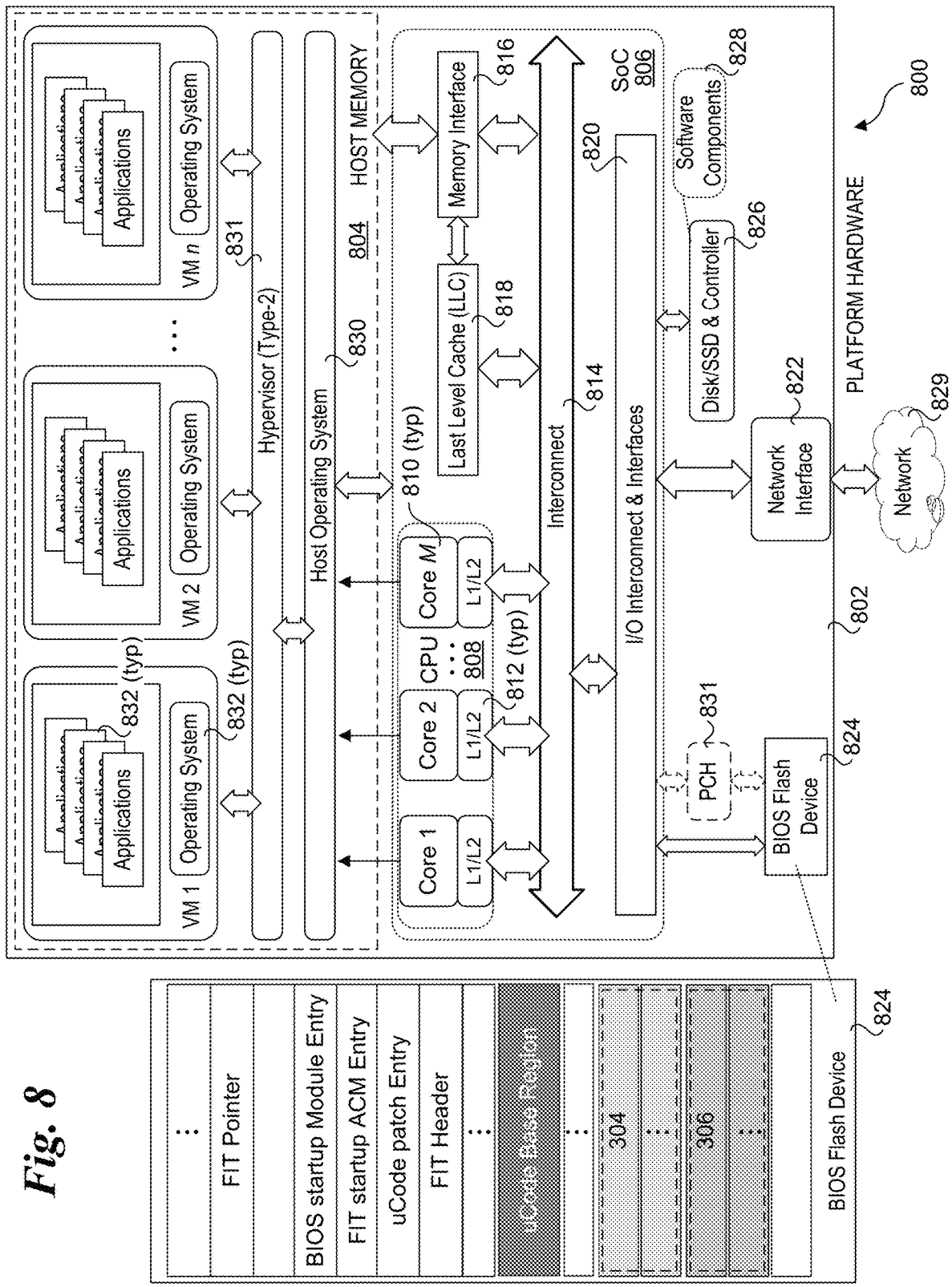
FIG. 8 is a schematic diagram of an exemplary compute platform on which embodiments disclosed herein may be implemented.

FIGS. 8 shows an embodiment of a platform architecture 800 corresponding to a computing platform suitable for implementing aspects of the embodiments described herein. Architecture 800 includes a hardware layer in the lower portion of the diagram including platform hardware 802, and a software layer that includes software components running in host memory 804. Architecture 800 implements the modular microcode (uCode) patch method to support runtime persistent update, as illustrated by the BIOS flash layout depicted for BIOS flash device 824 corresponding to the BIOS flash layout of diagram 300 in FIG. 3.

Platform hardware 802 includes a processor 806 having a System on a Chip (SoC) architecture including a central processing unit (CPU) 808 with M processor cores 810, each coupled to a Level 1 and Level 2 (L1/L2) cache 812. Each of the processor cores and L1/L2 caches are connected to an interconnect 814 to which each of a memory interface 816 and a Last Level Cache (LLC) 818 is coupled, forming a coherent memory domain. Memory interface is used to access host memory 804 in which various software components are loaded and run via execution of associated software instructions on processor cores 810.

Processor 806 further includes an Input/Output (I/O) interconnect hierarchy, which includes one or more levels of interconnect circuitry and interfaces that are collectively depicted as I/O interconnect & interfaces 820 for simplicity. Various components and peripheral devices are coupled to processor 806 via respective interfaces (not all separately shown), including a network interface 822, a BIOS flash device 824 in which BIOS uCode is stored having a BIOS flash layout illustrated in diagram 300 and discussed above. As an option, BIOS flash device 824 may be operatively coupled to processor 806 via a platform controller hub (PCH) 831. Platform hardware 802 also includes a disk drive or solid state disk (SSD) with controller 826 in which software components 828 are stored. Optionally, all or a portion of the software components used to implement the software aspects of embodiments herein may be loaded over a network 829 accessed by network interface 822.

During platform initialization, a current or new uCode image and various UEFI modules (not separately shown) are loaded into host memory 804 and booted, followed loading and initialization of various software components. The software components include a host operating system 830 and a Type-2 hypervisor 831 used to host n virtual machines (VMs) VM 1, VM 2 . . . VM n, each including an operating system 432 on which one or more applications 434 are run. Platform architectures employing containers, such as Docker®-type containers, may be implemented in a similar manner. In addition, non-virtualized computing platforms that only run a single instance of an operating system may also be used.

The uCode runtime patch update approach implemented by the embodiments disclosed herein provides several advantages. First, in cases where the uCode patch comprises a OS uCode runtime patch, it enables cloud customers to update the uCode runtime patch and the persistent patch into BIOS flash region at the same time, eliminating the requirement to reset systems to apply the persistent patch into BIOS flash (and the accompanying downtime to retrieve the updated image, install it, and reboot the system). Second, the number of new BIOS packages released purely for uCode update may be reduced. This can significantly reduce cloud customer operational effort on uCode update. Third, encapsulating the uCode patch(es) into a capsule format ensures the uCode capsule image is complaint across different vendors platforms for same the CPU SKU, including support for different stepping versions. This also provide the flexibility and simplicity for cloud customer to adopt different security options.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'M', 'n', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications. Thus, embodiments of this invention may be used as or to support a software program, software modules, and/or firmware (BIOS), executed upon some form of processor, processing core or embedded logic, a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented on a compute platform including non-volatile memory in which firmware microcode (uCode) are stored, the non-volatile memory having a layout partitioned into a plurality of regions, including a uCode base region, a first uCode extension region, and a second uCode extension region, the method comprising:
during first runtime operations of the compute platform following booting a first uCode image having a first version,
receiving a first uCode patch and writing uCode content contained therein to one of the first and second uCode extension regions as a second uCode image having a second version newer than the first version;
following a first platform reset,
detecting the second uCode image is present in the first or second uCode extension region and has a newer version than the first uCode image; and
booting the second uCode image.

2. The method of claim 1, further comprising:
copying the second uCode image into the uCode base region to sync-up a current uCode image in the uCode base region.

3. The method of claim 1, wherein the compute platform includes an operating system (OS) that is implemented during platform runtime operations, further comprising:
during the first runtime operations of the compute platform,
receiving an OS uCode runtime patch; and
implementing the OS uCode runtime patch during the first runtime operations,
wherein the first uCode patch comprises the OS uCode runtime patch.

4. The method of claim 1, further comprising:
during the first runtime operations, receiving a second uCode patch containing a third uCode image having a third version older than the second version, the second uCode patch being received prior to the first uCode patch;
writing the third uCode image to one of the first and second uCode extension regions;
when the third uCode image is written to the first uCode extension region, writing the second uCode image to the second uCode extension region; otherwise
when the third uCode image is written to the second uCode extension region, writing the second uCode image to the first uCode extension region.

5. The method of claim 4, further comprising:
following the first platform reset and prior to booting the second uCode image,
detecting presence of the second and third uCode images in the first and second uCode extension regions; and
one of,
determining the second uCode image has a version that is newer than the version of the third uCode image; or
determining the third uCode image is marked as invalid.

6. The method of claim 4, wherein when the third uCode image is written to the first or second uCode extension region it includes version indicia identifying the uCode image is the third version, and wherein when the second uCode image is written to the first or second uCode extension region it includes version indicia identifying the second uCode image is the second version, the method further comprising:
confirming the second uCode image has been successfully written to the first or second uCode extension regions; and
marking the version indicia for the third uCode image as invalid.

7. The method of claim 4, further comprising:
in conjunction with or following writing the third uCode image to one of the first and second uCode extension regions, updating a variable or pointer to point to the first or second uCode extension region the third uCode image is not written to; and
employing the variable or pointer to identify which of the first and second uCode extensions regions the second uCode image is to be written to.

8. The method of claim 1, further comprising:
receiving a Unified Extensible Firmware Interface (UEFI) uCode capsule package including a UEFI capsule header and a payload containing a uCode firmware volume (FV) comprising the first uCode patch; and
writing the uCode FV to the one of the first and second uCode extension regions as the second uCode image.

9. The method of claim 8, wherein the UEFI uCode capsule package includes authentication information signed with a certificate, further comprising using the authentication information to validate the UEFI uCode capsule package before writing the uCode FV to the one of the first and second uCode extension regions as the second uCode image.

10. A compute platform, comprising:
a processor;
a memory, coupled to the processor;
an operating system (OS), including executable instructions configured to be executed on the processor stored in at least one of a storage device coupled to the processor and the memory;
a network interface, operatively coupled to the processor;
a non-volatile memory device in which firmware instructions are stored operatively coupled to the processor, the non-volatile memory having a layout partitioned into a plurality of regions, including a microcode (uCode) base region, a first uCode extension region, and a second uCode extension region,
wherein execution of the firmware and the OS executable instructions on the processor enables the compute platform to,
boot the compute platform using a first uCode image in the uCode base region, the first uCode image having a first version;
boot the OS and initiate first runtime operations;

during the first runtime operations,
  receive a first uCode patch and write uCode content contained therein to one of the first and second uCode extension regions as a second uCode image having a second version newer than the first version;
following a first platform reset,
  detect the second uCode image is present in the first or second uCode extension region and has a newer version than the first uCode image; and
  boot the second uCode image.

11. The compute platform of claim 10, wherein execution of the firmware instructions on the processor further enables the compute platform to:
  copy the second uCode image into the uCode base region to sync-up a current uCode image in the uCode base region, wherein at least a portion of uCode in the uCode base region is replaced when the second uCode image is copied into the uCode base region.

12. The compute platform of claim 10, wherein execution of the firmware instructions and the OS executable instructions on the processor further enables the compute platform to:
  during the first runtime operations,
    receive a second uCode patch containing a third uCode image having a third version older than the second version, the second uCode patch being received prior to the first uCode patch;
    write the third uCode image to one of the first and second uCode extension regions;
    when the third uCode image is written to the first uCode extension region, writing the second uCode image to the second uCode extension region; otherwise
    when the third uCode image is written to the second uCode extension region, writing the second uCode image to the first uCode extension region.

13. The compute platform of claim 12, wherein execution of the firmware instructions on the processor further enables the compute platform to:
  following the first platform reset and prior to booting the second uCode image,
    detect presence of the second and third uCode images in the first and second uCode extension regions; and one of,
      determine the first uCode image has a version that is newer than the version of the second uCode image; or
      determine the second uCode image is marked as invalid.

14. The compute platform of claim 12, wherein when the third uCode image is written to the first or second uCode extension region it includes version indicia identifying the uCode image is the third version, wherein when the second uCode image is written to the first or second uCode extension region it includes version indicia identifying the second uCode image is the second version, and wherein execution of the firmware instructions on the processor further enables the compute platform to:
  confirm the second uCode image has been successfully written to the first or second uCode extension regions; and
  mark the version indicia for the third uCode image as invalid.

15. The compute platform of claim 12, wherein execution of the firmware instructions on the processor further enables the compute platform to:
  in conjunction with or following writing the third uCode image to one of the first and second uCode extension regions, update a variable or pointer to point to the first or second uCode extension region the third uCode image is not written to; and
  employ the variable or pointer to identify which of the first and second uCode extensions regions the second uCode image is to be written to.

16. The compute platform of claim 10, wherein execution of the firmware instructions and the OS executable instructions on the processor further enables the compute platform to:
  receive a Unified Extensible Firmware Interface (UEFI) uCode capsule package including a UEFI capsule header and a payload containing a uCode firmware volume (FV) comprising the first uCode patch; and
  write the uCode FV to the one of the first and second uCode extension regions as the second uCode image.

17. The compute platform of claim 16, wherein the UEFI uCode capsule package includes authentication information signed with one of an original equipment manufacturer of original design manufacturer certificate or signed with a cloud customer certificate, further comprising using the authentication information to validate the UEFI uCode capsule package before writing the uCode FV to the one of the first and second uCode extension regions as the second uCode image.

18. A flash Basic Input-Output System (BIOS) device in which BIOS instructions are stored, configured to be installed in a compute platform having a processor, memory, and a network interface, the flash BIOS device having a BIOS flash layout partitioned into a plurality of regions, including a microcode (uCode) base region, a first uCode extension region, and a second uCode extension region, wherein the BIOS instructions are configured to be executed on the processor to enable the compute platform to:
  boot the compute platform using a first uCode image in the uCode base region, the first uCode image having a first version;
  during first runtime operations of the compute platform, receive a first uCode patch and write uCode content contained therein to one of the first and second uCode extension regions as a second uCode image having a second version newer than the first version;
  following a first platform reset,
    detect the second uCode image is present in the first or second uCode extension region and has a newer version than the first uCode image; and
    boot the second uCode image.

19. The flash BIOS device of claim 18, wherein the BIOS instructions are configured to be executed on the processor to further enable the compute platform to:
  confirm the second uCode image has been successfully booted;
  copy the second uCode image into the uCode base region to sync-up a current uCode image in the uCode base region, wherein at least a portion of uCode in the uCode base region is replaced when the second uCode image is copied into the uCode base region; and
  in response to a second platform reset, boot the current uCode image from the uCode base region.

20. The flash BIOS device of claim 18, wherein the BIOS instructions are configured to be executed on the processor to further enable the compute platform to:
  during the first runtime operations,
    write a third uCode image contained in a second uCode patch received from the network via the network interface and having a third version older than the second version to one of the first and second uCode extension regions;

when the third uCode image is written to the first uCode extension region, write the second uCode image to the second uCode extension region; otherwise when the third uCode image is written to the second uCode extension region, write the second uCode image to the first uCode extension region.

* * * * *